(12) United States Patent
Roberts

(10) Patent No.: US 9,385,807 B2
(45) Date of Patent: Jul. 5, 2016

(54) LIGHT WAVE COMMUNICATION

(71) Applicant: Intel Corporation, Santa Clara, CA (US)

(72) Inventor: Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,617

(22) Filed: Mar. 28, 2014

(65) Prior Publication Data

US 2015/0280817 A1 Oct. 1, 2015

(51) Int. Cl.
*H04B 10/114* (2013.01)
*H04B 10/116* (2013.01)
*H04L 25/49* (2006.01)
*H04B 10/00* (2013.01)

(52) U.S. Cl.
CPC .............. *H04B 10/116* (2013.01); *H04B 10/00* (2013.01); *H04L 25/4902* (2013.01)

(58) Field of Classification Search
CPC . H04B 10/114; H04B 10/116; H04L 25/4902
USPC .................................. 398/118, 127, 130, 172
See application file for complete search history.

(56) References Cited

U.S. PATENT DOCUMENTS

| 8,334,898 B1* | 12/2012 | Ryan et al. ....................... 348/61 |
| 2011/0052214 A1* | 3/2011 | Shimada et al. ............... 398/202 |
| 2014/0010540 A1* | 1/2014 | Jeong et al. ...................... 398/66 |
| 2014/0186052 A1* | 7/2014 | Oshima et al. ................. 398/130 |
| 2014/0280316 A1* | 9/2014 | Ganick et al. .................. 707/769 |

* cited by examiner

*Primary Examiner* — Dalzid Singh
(74) *Attorney, Agent, or Firm* — International IP Law Group, P.L.L.C.

(57) ABSTRACT

An apparatus for light wave communications is described herein. The apparatus includes an image sensor and a region of interest (ROI) sub-sampler. The image sensor is to receive a first low frequency data stream from a light source. Additionally, data from the ROI sub-sampler is used to configure the image sensor to receive a second data stream from the light source.

24 Claims, 9 Drawing Sheets

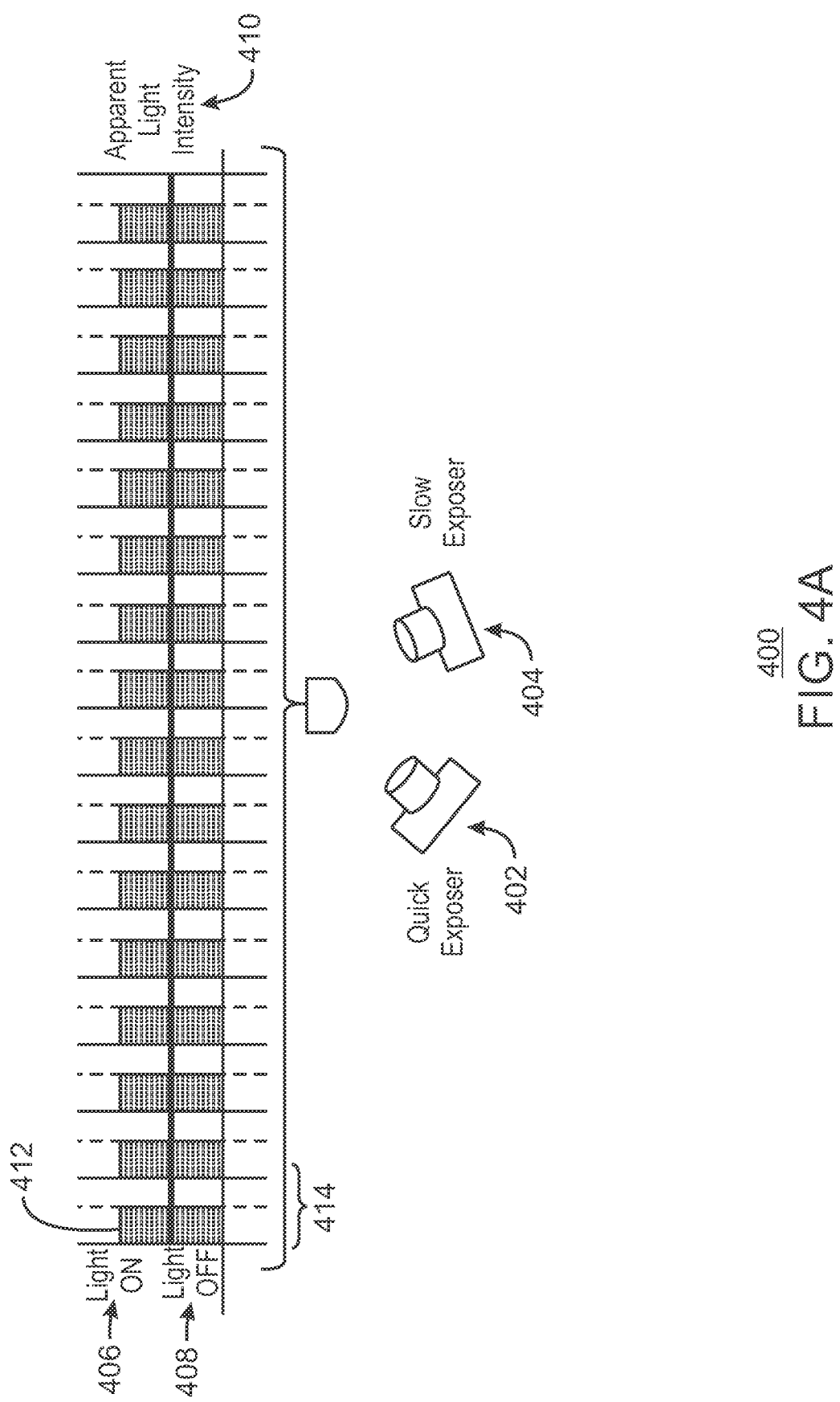

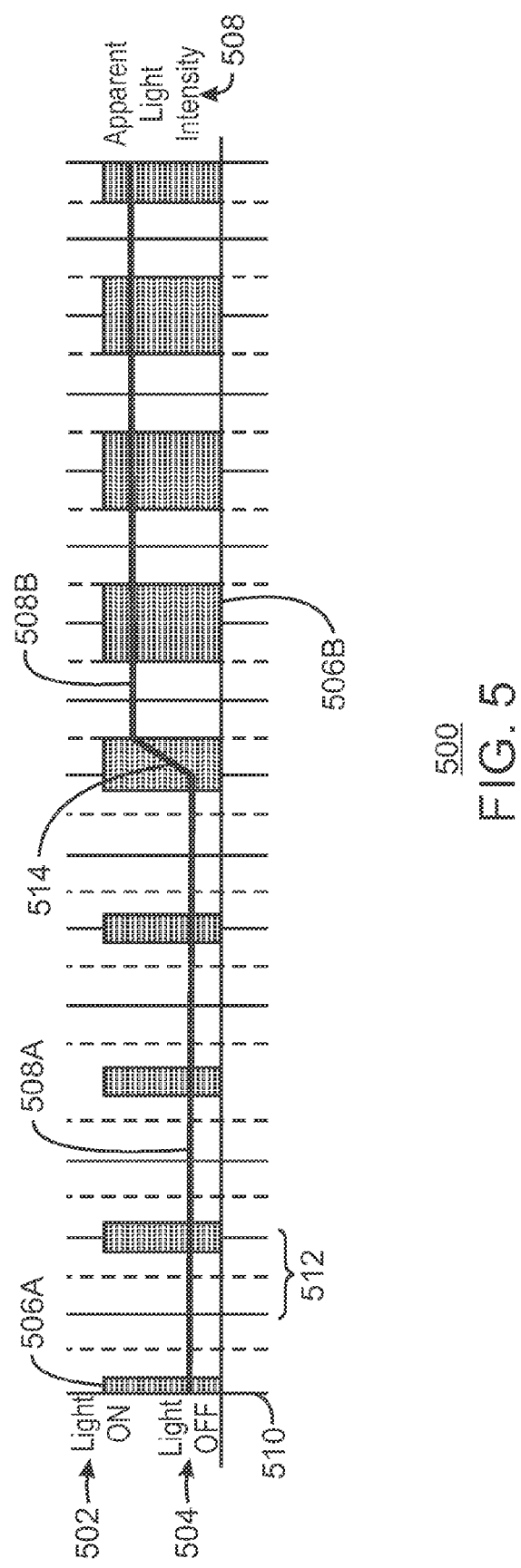

800

LIGHT WAVE COMMUNICATION

TECHNICAL FIELD

The present techniques generally relate to light wave communication. Specifically, the present techniques relate to the transmission of two data streams using light wave communication, which includes infrared, visible and ultraviolet wavelengths.

BACKGROUND ART

In light wave communication light is pulsed ON and OFF to send data. The pulsing may be at a rate that can be seen or not be seen by a human being. If the pulsation of the light exceeds a flicker perception frequency of the human eye, then a person will see only an average light intensity of the light.

BRIEF DESCRIPTION OF THE DRAWINGS

FIGS. 4A and 4B is an illustration of a first exposer and a second exposer;

FIG. 5 is an illustration of data transmission using light wave communication;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
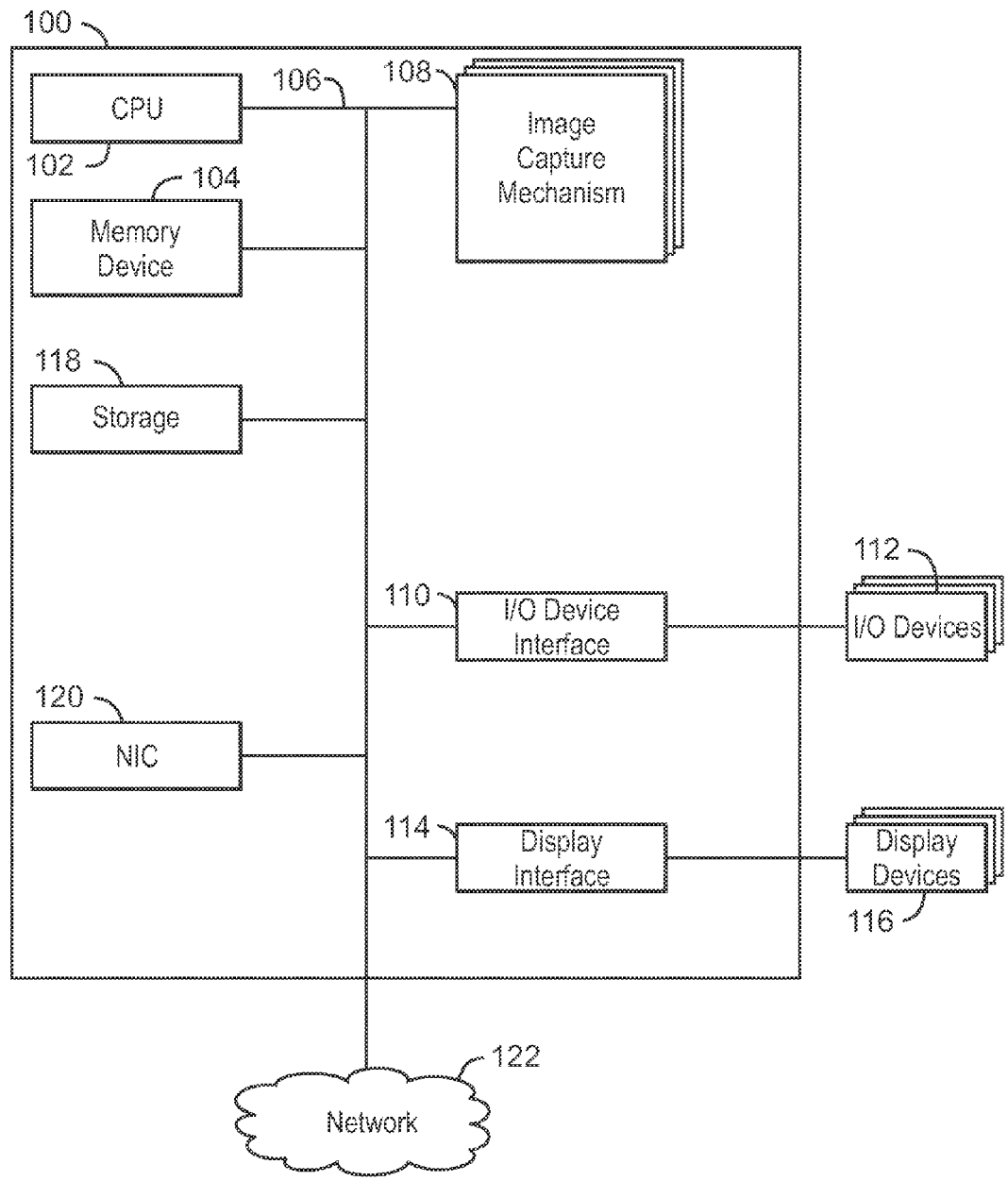
FIG. 1 is a block diagram of a computing device that may be used to receive two data streams from a single light source.

As discussed above, light wave communication uses pulses of a light to communicate data across the light. In some cases, the light is a light emitting diode (LED). The pulses occur using ON-OFF keying of the LED light. An image sensor can be used to receive the data from the modulation of light. Multiple lights can occur in a scene captured by the image sensor. Accordingly, a search is performed on the scene with multiple lights in order to determine which lights are modulated and are transmitting data. In a scene with multiple lights, region-of-interest (ROI) sub-space sampling on each light may be performed in a sequential fashion to search for the modulated lights. However, the scanning to determine ROI sub-space sampling targets is a time consuming process.

Embodiments described herein disclose light wave communication that transmits two streams of data from one modulated light source. In examples, a first data stream is a low frequency amplitude envelope that acts as a beacon to indicate that a light is sending a second data stream at a high frequency. In this manner, two data streams are able to be sent using one light. Moreover, a determination of which light is transmitting data in a scene can be done without ROI sub-space sampling. In examples, the light is an LED light that can quickly transition between an on and off state.

In embodiments, "ingest" as used herein could also indicate "receive." For example, an apparatus for light wave communications described herein may include an image sensor and a region of interest (ROI) sub-sampler. The image sensor may ingest a first low frequency data stream from a light source, and data from the ROI sub-sampler is to configure the image sensor to ingest a second data stream from the light source. Moreover, in embodiments, the image sensor can be configured to ingest a second data stream by using the ROI sub-sampling to increase an effective frame rate of the image sensor.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to receive two data streams from a single light source. The computing device 100 may be, for example, a laptop computer, desktop computer, ultrabook, tablet computer, mobile device, or server, among others. Further, the computing device may be included in an automobile. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include image capture mechanisms 108. As shown, the CPU 102 may be coupled through the bus 106 to the image capture mechanisms 108. The image capture mechanisms 108 may be configured to perform any number of image capture operations within the computing device 100. For example, the image capture mechanisms 108 may be configured to capture still images such as photographs. The image capture mechanisms 108 may also be configured to capture videos, where a video can include any number of frames. In some cases, the image capture mechanisms 108 are image sensors. The image sensors may be associated with a shutter speed or exposure time that indicates the amount of time that the image sensor is exposed to light such than an image or series of frames is capture. When the image sensor is set to a first exposure time such that several pulses occur during the exposure time resulting in an apparent light intensity being observed, the image sensor can detect a first data stream from the average light intensity. When the image sensor is set to a second exposure time such that each pulse from a light source is observed, the image sensor can detect a second data stream from each pulse.

The CPU 102 may also be connected through the bus 106 to an input/output (I/O) device interface 110 configured to connect the computing device 100 to one or more I/O devices 112. The I/O devices 112 may include, for example, a keyboard and a pointing device, wherein the pointing device may include a touchpad or a touchscreen, among others. The I/O devices 112 may be built-in components of the computing device 100, or may be devices that are externally connected to the computing device 100. In some examples, an I/O device 112 may be an LED light used to transmit data via light wave communications. The CPU 102 may also be linked through the bus 106 to a display interface 114 configured to connect the computing device 100 to a display device 116. The display device 116 may include a display screen that is a built-in component of the computing device 100. The display device 116 may also include a computer monitor, television, or projector, among others, that is externally connected to the computing device 100.

The computing device also includes a storage device 118. The storage device 118 is a physical memory such as a hard drive, an optical drive, a thumbdrive, an array of drives, or any combinations thereof. The storage device 118 may also include remote storage drives. The computing device 100 may also include a network interface controller (NIC) 120 that is configured to connect the computing device 100 through the bus 106 to a network 126. The network 126 may be a wide area network (WAN), local area network (LAN), or the Internet, among others.

The block diagram of FIG. 1 is not intended to indicate that the computing device 100 is to include all of the components shown in FIG. 1. Rather, the computing system 100 can include fewer or additional components not illustrated in FIG. 1 (e.g., sensors, power management integrated circuits, additional network interfaces, etc.). The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
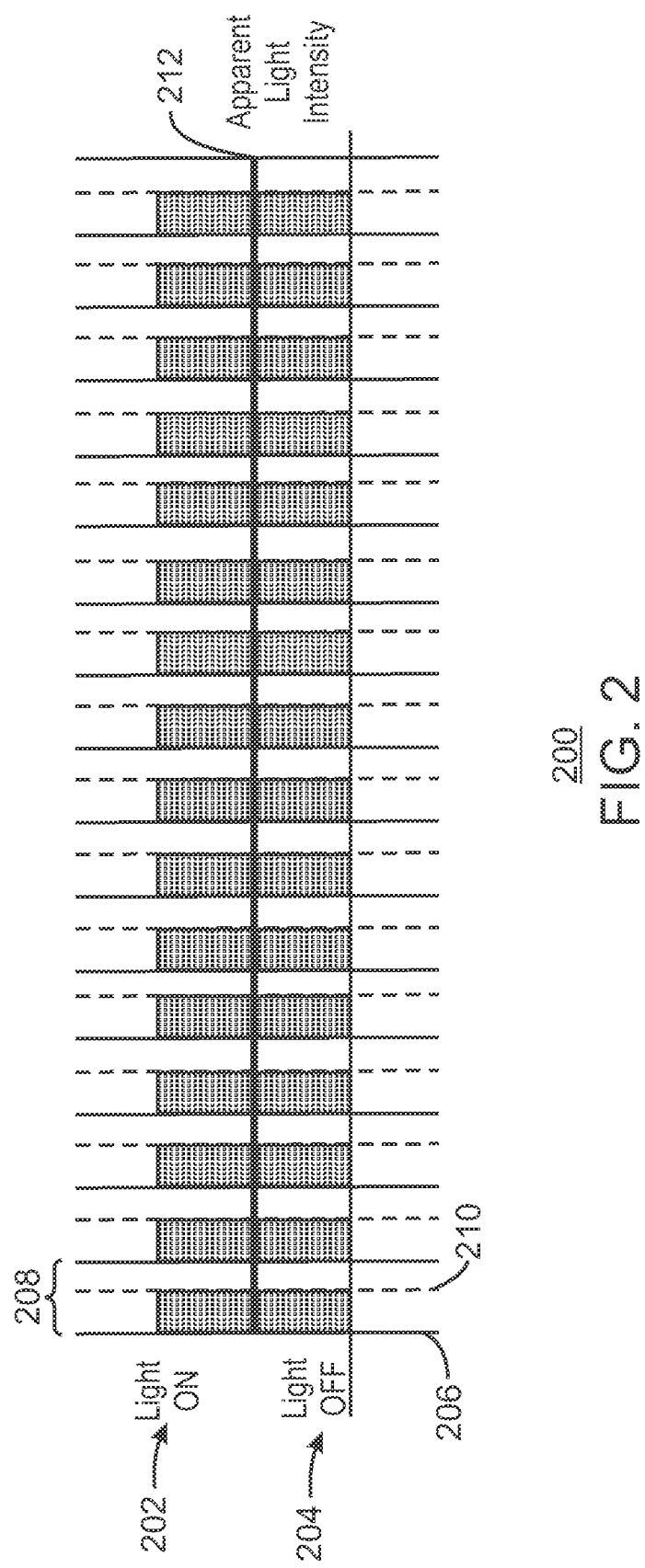
FIG. 2 is an illustration of light wave communications across bit time periods.

FIG. 2 is an illustration of light wave communications 200 across bit time periods 208. As discussed above, the light wave communications can be implemented through the on-off keying of a light. In across the bit time periods 208, a light on 202 indicates when the light is turned on and illuminating light. A light off 204 indicates when the light is off and not illuminating light. Each of the solid vertical lines 206 marks the beginning of the bit time period 208 where a bit of data can be transmitted using the light. Each of the dashed vertical lines 210 marks the middle of the time period 208 where a bit of data can be transmitted using the light. Moreover, a line 212 represents an average light intensity that occurs across the plurality of bit time periods 208.

As illustrated in FIG. 2, the light on 202 occurs during the first half of each bit time period 208. During the second half of the bit time period 208, the light off 204 occurs. The apparent light intensity 212 is averaged across the plurality of bit time periods 208, and this results in an average light intensity that is midway between the light off 204 and the light on 202.

Figure 3:
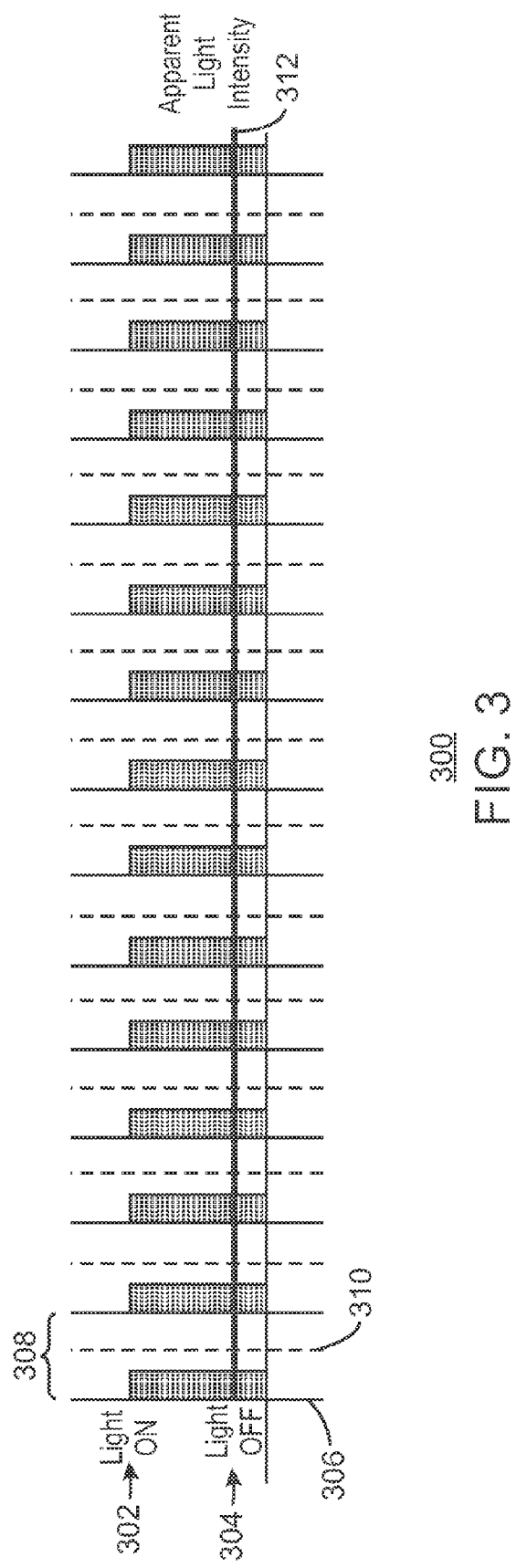
FIG. 3 is another illustration of light wave communications across bit time periods.

FIG. 3 is another illustration of light wave communications 300 across bit time periods 308. In FIG. 3, a light on 302 occurs when the light is turned on, and a light off 304 occurs at reference number 304. Each of the solid vertical lines 306 marks the beginning of a time period 308 where a bit of data can be transmitted. Each of the dashed vertical lines 310 marks the middle of the time period 308 where a bit of data can be transmitted. Moreover, a line 312 represents an average light intensity that occurs across each time period. As illustrated in FIG. 3, the light on 302 occurs during the first half of each time period 308. During the second half of the time period 308, the light off 304 occurs. The apparent light intensity 312 is averaged across all of the time periods 308. However, the light on 302 occurs for approximately the first quarter of each time period 308. When compared to the light on 202 in FIG. 2, each light on pulse is wider than the light on 302 in FIG. 3. This results in a lower average light intensity 312 when compared to the average light intensity 212 of FIG. 2, where the light on 202 occurs for a larger portion of each time period 208.

In FIGS. 2 and 3, each portion of the bit time where the light is on may be referred to as a pulse. During each bit time period, the pulse can be used to indicate the particular bit value sent. For example, the bit value may be a logic level one or a logic level zero, depending on the pulse during each bit time period. Pulse width modulation (PWM) can be used to alter with width of each pulse in order to encode data for transmission using the on-off keying of a light source.

Moreover, as discussed above, an image sensor can be used to receive data created by the pulses of light. In some cases, the on and off keying to create pulses of light is at a sufficient rate such that the human eye cannot see the pulses. The image sensor may be included in the camera of a smart device, such as a tablet, mobile phone, laptop computer, and the like. Additionally, the image sensor could be included in the camera of a vehicle. The camera, when in the video mode, operates at a given frame rate which establishes the rate at which the light is sampled and hence limits the maximum allowable transmitted bit rate. Further, the camera, when operating in a normal frame rate mode that gives the full field-of-view (i.e. 30 fps), would capture the entire scene observed by the image sensor in order to receive data created by the pulses of light. The camera frame rate sets the sample rate, which has implications on the bit rate in light wave communication.

A region of interest (ROI) within the scene observed by the image sensor can be selected in order to increase the bit rate. The image sensor will process those pixels within the region of interest. To determine the region of interest, a group of frames can be scanned and the image sensor can select lights with a first data stream. Once the region of interest is selected, the sample frame rate of the image sensor can be increased by an amount proportional to the reduction in pixels from the full frame to the smaller region of interest. For example, if the scene captured by a full frame of the image sensor includes a million pixels, a region of interest may be determined to include a thousand pixels from the million pixel frame. The region of interest can be scanned to determine the frame rate applicable to the region of interest, and the remaining pixels can be ignored. For an illustrative example, consider a camera that is designed to process a pixel in Tpixel seconds. To determine an upper bound on this Tpixel time, assume there are have a million pixels, operating at a nominal maximum frame rate of 30 fps. The maximum time to process one pixel would be:

$$Tpixel = \frac{\left(\frac{1}{30}\right)}{1,000,000} = 33.3 \ \mu S$$

Hence, the time to process 1000 pixels would be 33.3 uS. The resulting frame rate would be 30,000 fps. Accordingly, as a result of a smaller region of interest, the sample rate of the image sensor can be increased by approximately a factor of one thousand. Continuing with the example of a camera with a frame rate of thirty frames per second where each frame includes one million pixels, the frame rate can be increased to thirty-thousand frames per second (fps) when a thousand pixels of each frame are scanned.

FIG. 4A is an illustration of a first exposer 402 and a second exposer 404. In some cases, an exposer is a portion of a camera responsible for the exposure time. The exposer can be a shutter and the shutter speed could regulate the exposure time. Consider the light on 406 and light off 408 sent by a light and observed by both the first exposer 402 and the second exposer 404. The light has an apparent light intensity 410 from a plurality of pulses of light 412. In FIG. 4A, the first exposer 402 has a short exposure time, and may be referred to as "quick." The second exposer 402 has a slow or long exposure time, and may be referred to as "slow." The first exposer 402 can be used to observe the high rate pulsing of each pulse of light 412. The second exposer 404 can be used to perceive the average light intensity 410; that is, it can observe the time varying amplitude envelope. The second exposer 404 will not detect each pulse of light 412, as the shutter of the second exposer 404 does not open and close with enough speed to observe the pulses of light 412.

Figure 4B:
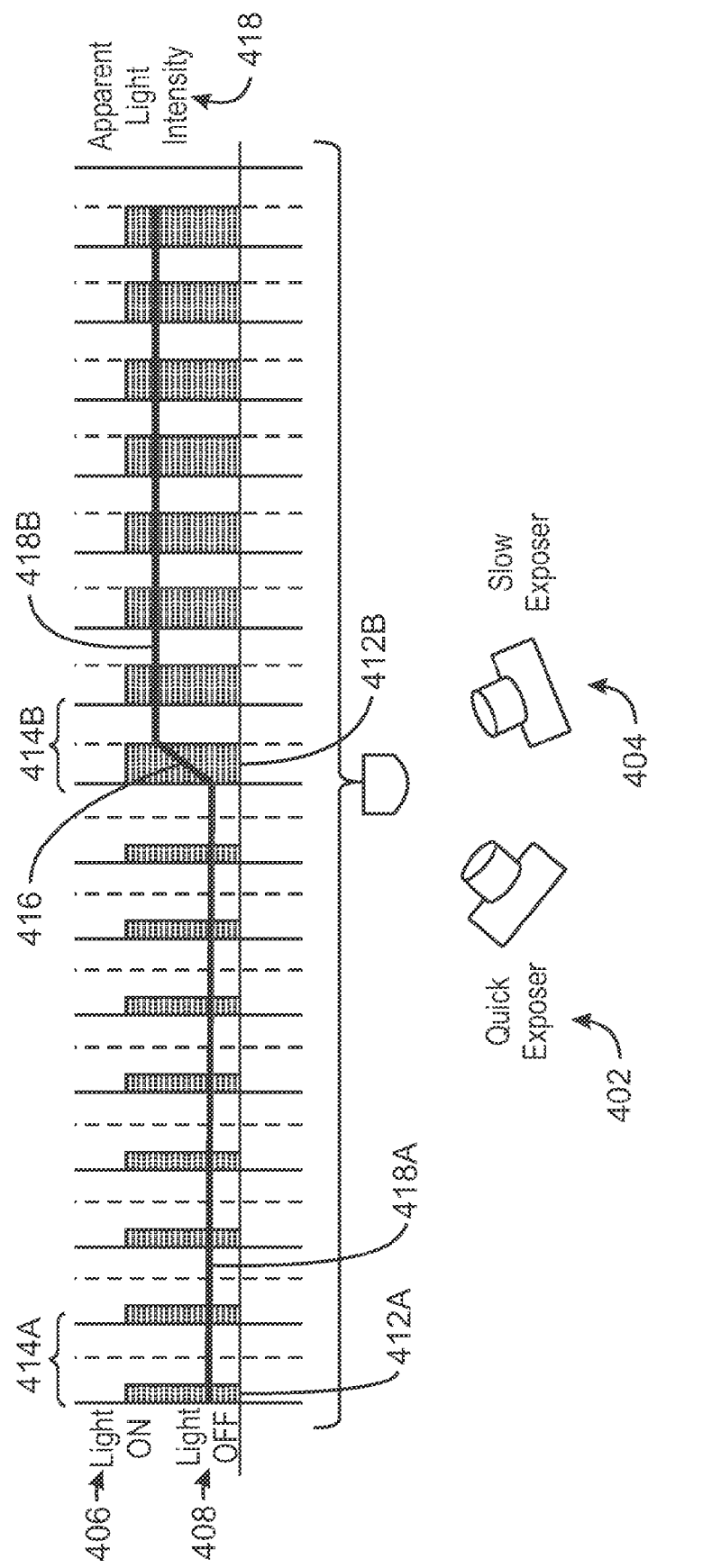

If the high rate pulse duty cycle is varied in a periodic manner, at a sufficiently low frequency, the camera with the quick exposer still sees only high rate pulses, while the camera with the slow exposer time perceives the light has a time variant intensity at the lower frequency. FIG. 4B is an illustration 420 of a time variant apparent light intensity 418 at a lower frequency. Consider the light on 406 and light off 408 are sent by a light and observed by both the first exposer 402 and the second exposer 404. The pulses 412 are periodically varied in order to produce the time variant apparent light intensity 418. In particular, the plurality of pulses of light 412A result in an apparent light intensity 412A. The pulses are then varied as a plurality of pulses of light 412B. The pulses of light 412B result in an apparent light intensity of 418B. Moreover, a transition apparent light intensity 416 occurs when the pulses are varied from the pulses of light 412A to the pulses of light 412B. The pulses of light 412A have a pulse width that is narrower than pulse width of the pulses of light 412B. Accordingly, the apparent light intensity 410B is greater than the apparent light intensity 410A. In FIG. 4B, the first exposer 402 has a quick exposure time such that it can detect the pulses of light 412A and the pulses of light 412B. The second exposer 402 has a slow exposure time such that it detects the periodic variation in the apparent light intensity that occurs as the pulse width is varied. The variation in the apparent light intensity may appear as a flicker, twinkle, or blinking of the light as seen by the image sensor (but not necessarily by the human eye). Accordingly, the second exposer 404 will detect a data stream that includes an amplitude envelope imparted on the high rate pulses by the pulse width modulation, while the first exposer 402 detects the high rate pulses.

The bit value of the high rate pulses is not dependent on the width of the pulses. Rather, in some cases the high rate pulses can use a form of pulse position modulation referred to as variable pulse width modulation (VPPM) to encode data while accommodating PWM. This VPPM may also be a form of Manchester encoding. If a pulse occurs during the first half of the bit time (light on), then that is encoded as a logic one level. If the pulse occurs in the second half of a bit time then that is encoded as a logic level zero. The pulse width may be considered irrelevant in determining the logic level. In some cases, the width of the pulse can be adjusted as necessary to impart a first data stream onto the light, while the pulse position is varied in order to impart a second data stream onto the same light.

In this manner, a camera with a sufficiently long exposure time can detect the flickering or twinkling of the light. However, a camera with a sufficiently short exposure time can ascertain the position of the pulse within the bit time slot and determine a logic level of the bit. As a result, two different data streams can be transmitted using a single light source.

FIG. 5 is an illustration 500 of data transmission using light wave communication. A light on 502 and a light off 504 that are used to create pulses of light 506A and 506B. The pulses of light 506A create an apparent light intensity 508A, and the pulses of light 506B create an apparent light intensity 508B. A transition between the apparent light intensity 508A and the apparent light intensity 508B occurs at reference number 514.

As discussed above, data can be encoded on to the light by observing the position of the pulse within the bit time. For example, a logic level one can be sent by placing the pulse at the beginning of the bit time. A logic level zero can be sent by placing the pulse at the end of the bit time. In FIG. 5, a new bit time period 512 begins with each solid line 510. Each bit time period 512 alternates between a pulse at the beginning of the period and a pulse at the end of the period. Accordingly, the data set sent by the pulses 506 in FIG. 5 is a logic 1010101010101010, as the pulse position within the bit time period 512 indicates the value of the bit to be transmitted. A camera with a sufficiently short exposure time can be used to capture the bit pattern of the pulses. Simultaneously, a camera with a sufficiently long exposure time with capture a twinkling light with a fluctuating intensity. The transition 514 represents then change in intensity that is perceived by a camera with a sufficiently long exposure time. Although the present techniques are described by representing a logic level one with a pulse at the beginning of the bit time period and a logic level zero with a pulse at the end of the bit time period, any encoding policies can be used. As such, in examples a logic level one with a may be indicated by a pulse at the end of the bit time period and a logic level zero may be indicated with a pulse at the beginning of the bit time period.

The transition 514 can be used to repeat a pattern of flickering, twinkling, or blinking for the second stream of data. In some cases, the second stream of data is set to be more than 100 Hz as to not be perceived by human eyes. Thus, by adjusting the duty cycle of the pulses that are transmitting the high frequency data to be detected by the camera with the sufficiently short exposure time, a secondary signal can be imparted the group of pulses which is caused by a fluctuating or twinkling intensity of the light as seen by the image sensor.

Consider an example where the flicking light is created by pulses of light at 105 Hertz (Hz). At 105 Hz, the pulses of light it cannot be seen by human eyes. However, if a 30 frame per second camera observes the light, adjustments can be made to the pixel integration time to enable the camera to see the 105 Hz pulses. However, sampling the 105 Hz light at a rate of 30 frame a second can result in under-sampling. Under-sampling results in frequency aliasing such that the resultant aliased frequency lies between 0 Hz and FPS/2 where FPS is the camera frames per second rate. This is mathematically expressed as $$F_{alias} = \text{abs}\left(\text{round}\left(\frac{F_{OOK}}{FPS}\right) \cdot FPS - F_{OOK}\right)$$

For example, if FPS=30 fps and $F_{ook}$=127 Hz, then $F_{alias}$=7 Hz. Likewise, if $F_{ook}$=105 Hz then $F_{alias}$=15 Hz.

In the preceding example, integer harmonics may be used to adjust the sampling rate. An integer harmonic is a multiple of the camera frame rate closest to the data frequency that satisfies the expression round $$\left(\frac{F_{OOK}}{FPS}\right)$$

where round(•) indicates rounding to the nearest integer value. In the case where Fook=105 Hz, the integer harmonic is 4. The difference between the date stream frequency of 105 Hz and the integer harmonic of 4*FPS=120 Hz is 15 Hz. As a result, the alias frequency produced by the camera sampling is the equivalent of 15 Hz.

By sampling a portion of the entire scene captured by the camera, the effective sampling rate of the portion can be increased. This is because each pixel takes approximately Tpixel seconds to process such that processing M pixels will take approximately M*Tpixel seconds. Since all the pixels are processed during each frame, the smaller the number M, the faster the frame rate.

Figure 6:
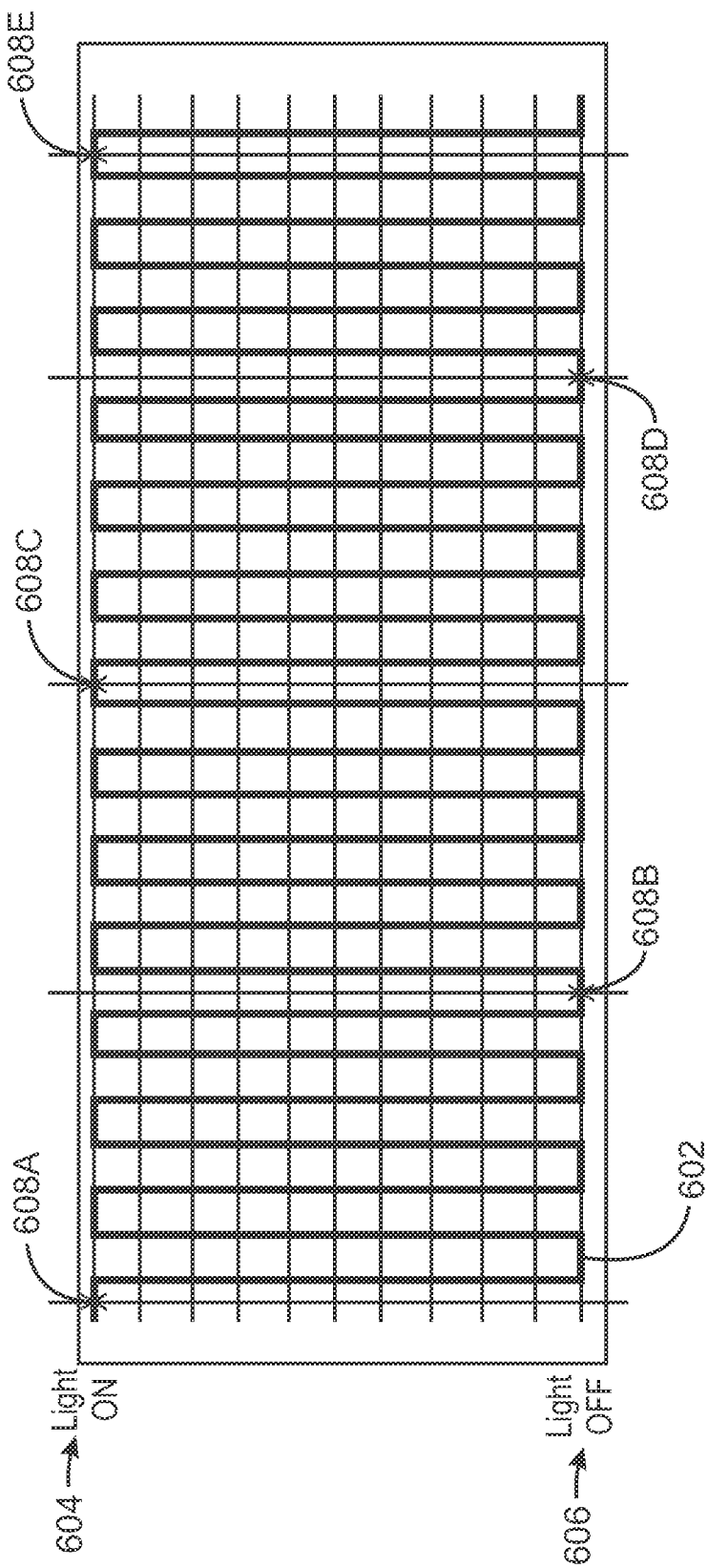
FIG. 6 is an illustration of sub-sampling aliasing.

FIG. 6 is an illustration of sub-sampling aliasing 600. A line 602 alternates between a light on level 604 and a light off level 606. Accordingly, when the line 602 is at a high value 604, the light is on. When the light 602 is at a low value 606, the light is off. This results in a square wave, as the light is turning on and off. Continuing with the previous example, this square wave represents 105 Hz that is sampled at 30 samples per second by the camera. Each of the x's at points 608A, 608B, 608C, 608D, and 608E represent sampling points of the camera at thirty frames per second of the 105 Hz frequency represented by the line 602. The first time the camera captures a sample at point 608A, the light is on. The next time the camera captures a sample at point 608B, the light is off. This process repeats such that it appears to the camera that the light is modulated at 15 Hz.

In some cases, the results from the image sensor are stored in a matrix to determine each region of interest. If the image sensor is a color matrix, then the dimensions of the matrix are 3×NumRows×NumCols. A black and white image is stored in a two dimensional array with NumRows×NumCols. In an example, assume a black and white image. The frame rate is set to provide a full field of view, and the matrix is searched on a frame by frame basis looking for light sources that are "blinking." An uncertainty region is assumed around the light source. For example, the uncertainty region may be 30×30 pixels. The camera can be set to ingest or receive those 900 pixels of interest. Since there are less pixels to process, they can be ingested much faster than before; hence, the sample rate is increased. The actual number of pixels to ingest may be set by hardware limitations or software ambiguity, such as region of uncertainty due to camera vibration and jitter, for example.

Figure 7:
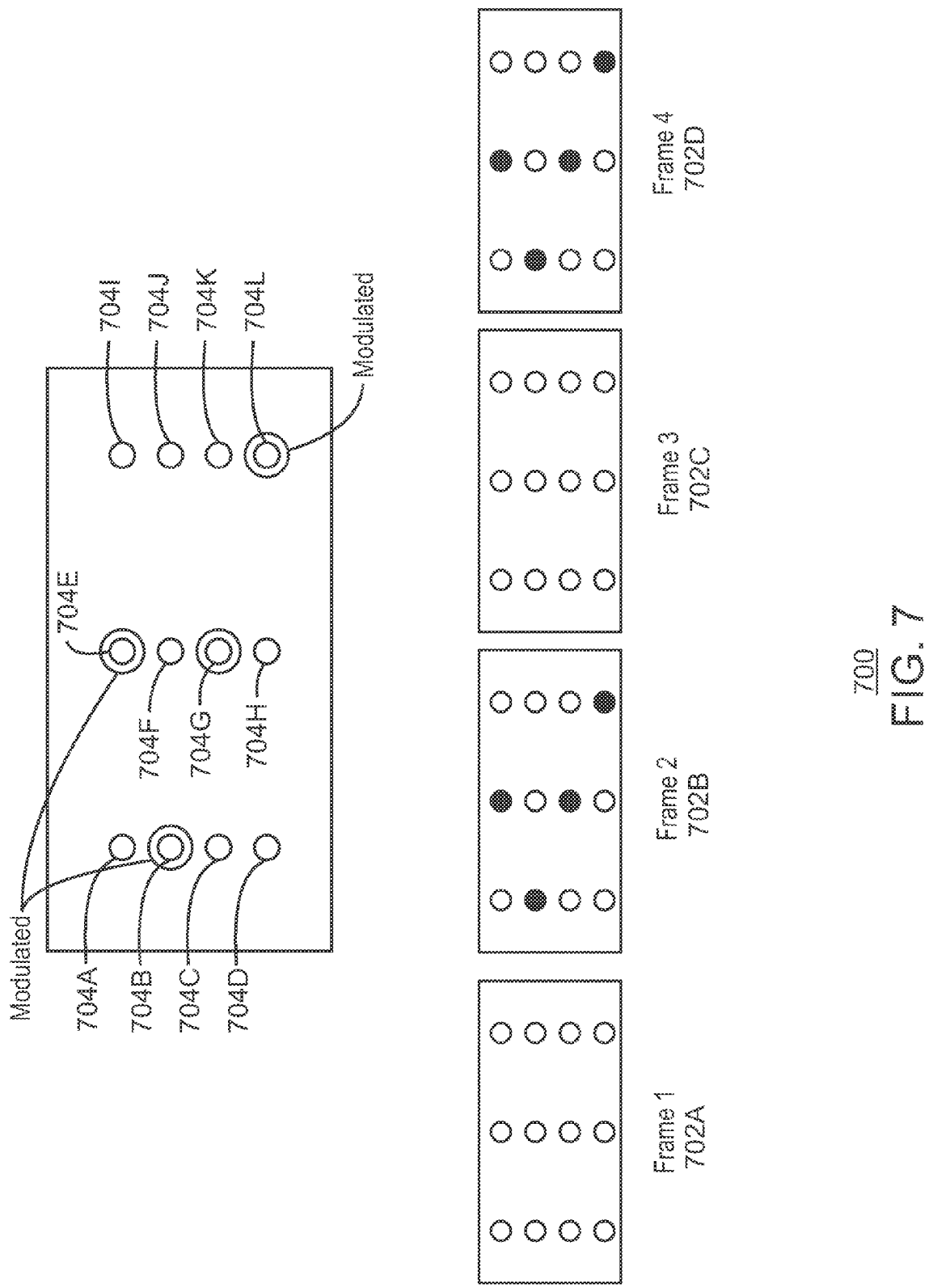
FIG. 7 is a group of four frames.

FIG. 7 is a group 700 of four frames 702A, 702B, 702C, and 702D. In some embodiments, a camera will record a short video of a scene including a group of frames, and then ascertain which lights are modulated by observing which lights appear to be blinking. Once the blink lights are determined, these lights will be the target of region of interest sub-sampling. As a result of the ROI sub-sampling, the effective sampling rate of the camera can be increased.

Each frame includes twelve lights 704A-704L. In frame 702A, each is on. At frame 702B, four lights 704B, 704E, 704G, and 704L have turned off. At frame 702C, each is on. Again, at frame 702D, the same four lights 704B, 704E, 704G, and 704L have turned off. Accordingly, the four lights 704B, 704E, 704G, and 704L in this short video are modulated, and appear to be blinking. A ROI sub-sampling algorithm can be applied to each blinking light source. Through ROI sub-sampling, the effective sampling rate of the camera can be increased such that the pulse position of each light pulse can be detected. In some cases, the camera could be used to sample the lights of an automobile. Accordingly, the lights could represent four lights on the same car, or one light on four different cars. The lights that transmit data could also be lights on a sign or billboard.

Figure 8:
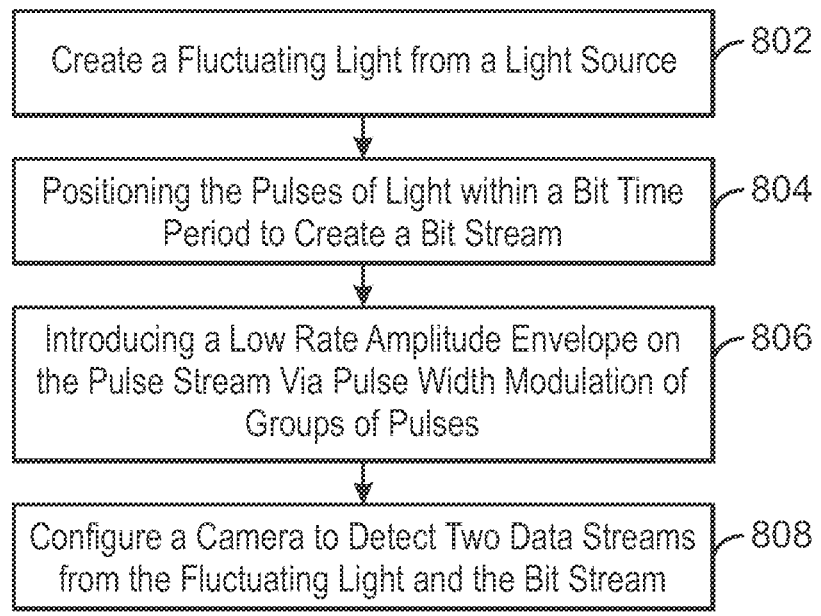
FIG. 8 is a process flow diagram of a method for light wave communications.

FIG. 8 is a process flow diagram of a method 800 for light wave communications. At block 802, a fluctuating light is created from a light source by pulsing the light source on and off. At block 804, a bit stream is created by positioning the pulses of light within a bit time period. At block 806, the duty cycle of the pulses are adjusted to create a low rate pulse width modulation envelope. At block 808, a camera is configured to detect two data streams from the fluctuating light and the bit stream.

The fluctuating light and the bit stream may be two data streams originating from a single light source. The camera can be used to determine a target for ROI sub-sampling, and the data from the ROI sub-sampling is used to configure the camera to detect a bit stream from the fluctuating light based on the target for ROI sub-sampling. In some cases, the fluctuating light is periodically varied in order to produce a time variant apparent light intensity. The modulated, time variant apparent light intensity can be used to send a low rate indication beacon that can be processed by the camera, viewing the whole scene, to ascertain which light sources actually are transmitting high rate data. The camera can then be reconfigured to receive the high rate data from the same light source.

In some embodiments, vehicle traffic on the highway can use the present techniques to modulate lights of a car with data that can be processed by other cars' cameras to figure out relative position with high degree of accuracy. The present techniques can also be used to create intelligent billboards, signs, and displays.

EXAMPLE 1

A system for light wave communications is described herein. The system includes a light source, a memory and a processor. The memory that is to store instructions and is communicatively coupled to the light source. The processor is communicatively coupled to the light source and the memory. When the processor is to execute the instructions, the processor is to generate a first data stream using an apparent intensity of the light source, and generate a second data stream using a pulse position of the light source.

The light source may be an LED light source. The processor may periodically vary the first data stream in order to produce a time variant apparent light intensity. The processor may also periodically vary the first data stream by varying a width of light pulses from the light source. Further, the processor may periodically vary the first data stream and the variation may be undetectable by humans. Additionally, the processor may periodically encode the second data stream using variable pulse width modulation (VPPM). The processor can also encode the second data stream using Manchester encoding. Furthermore, the system may be a component of an automobile, or the light source may be a component of a billboard, sign, or any combination thereof. A receiver may detect a bit value in the second data stream.

EXAMPLE 2

An apparatus for light wave communications is described herein. The apparatus includes an image sensor and a region of interest (ROI) sub-sampler. The image sensor is to receive a first low frequency data stream from a light source, and data from the ROI sub-sampler is to configure the image sensor to receive a second data stream from the light source.

The second data stream may be a stream of high rate pulses. The second data stream may be a stream of high rate pulses varied using variable pulse width modulation (VPPM). Additionally, the second data stream may be a stream of high rate pulses, where each pulse transmits a bit of data. The image sensor may receive a second data stream by using the ROI sub-sampling to increase an effective frame rate of the image sensor. Further, the first low frequency data stream from a light source may be periodically varied in order to produce a time variant apparent light intensity. The region of interest sub-sampler may determine a region of interest based on the first low frequency data stream. Also, the region of interest sub-sampler may configure the image sensor to receive a second data stream from the light source, where the second data stream is from the region of interest. The region of interest may be scanned to determine a frame rate applicable to the region of interest. Moreover, a sample rate of the image sensor may be increased to receive the second data stream from the light source.

EXAMPLE 3

A method of light wave communication is described herein. The method includes creating a fluctuating light from a light source by pulsing the light source on and off, and creating a bit stream by positioning the pulses of light within a bit time period. The method also includes creating a low rate modulation envelope on the pulses by pulse width modulation, and configuring a camera to detect two data streams from the low rate modulation envelope and the bit stream.

The camera may be configured to detect the bit stream based on ROI sub-sampling. Further, the method may include detecting the fluctuating light with the camera to determine a target for ROI sub-sampling, and configuring the camera to detect the bit stream from the fluctuating light based on the target for ROI sub-sampling. The fluctuating light may be periodically varied in order to produce a time variant apparent light intensity. Additionally, the bit stream may be encoded using variable pulse width modulation (VPPM). The fluctuating light may be an LED light source. Moreover, a first data stream may be the bit stream, and a second data stream may be a low rate modulation envelope created on the pulses. The low rate modulation envelope may indicate that a second data stream may be transmitted from the light source. The light source may originate from intelligent billboards, signs, displays, or vehicles, or any combination thereof. Additionally, the light wave communication may indicate a position of the camera.

EXAMPLE 4

An apparatus for light wave communications is described herein. The apparatus includes a means to receive data from the light source and a region of interest (ROI) sub-sampler. The means to receive data from the light source is to receive a first low frequency data stream from a light source, and data from the ROI sub-sampler is to configure the means to receive data from the light source to receive a second data stream from the light source.

The second data stream may be a stream of high rate pulses. The second data stream may be a stream of high rate pulses varied using variable pulse width modulation (VPPM). Additionally, the second data stream may be a stream of high rate pulses, where each pulse transmits a bit of data. The means to receive data from the light source may receive a second data stream by using the ROI sub-sampling to increase an effective frame rate of the means to receive data from the light source. Further, the first low frequency data stream from a light source may be periodically varied in order to produce a time variant apparent light intensity. The region of interest sub-sampler may determine a region of interest based on the first low frequency data stream. Also, the region of interest sub-sampler may configure the means to receive data from the light source to receive a second data stream from the light source, where the second data stream is from the region of interest. The region of interest may be scanned to determine a frame rate applicable to the region of interest. Moreover, a sample rate of the means to receive data from the light source may be increased to receive the second data stream from the light source.

EXAMPLE 5

A computer readable medium is described herein. The computer readable medium includes code to direct a processor to create a fluctuating light from a light source by pulsing the light source on and off, and create a bit stream by positioning the pulses of light within a bit time period. The computer readable medium also includes code to direct a processor to create a low rate modulation envelope on the pulses by pulse width modulation, and configure a camera to detect two data streams from the low rate modulation envelope and the bit stream.

The camera may be configured to detect the bit stream based on ROI sub-sampling. Further, the computer readable medium may direct the processor to detect the fluctuating light with the camera to determine a target for ROI sub-sampling, and configure the camera to detect the bit stream from the fluctuating light based on the target for ROI sub-sampling. The fluctuating light may be periodically varied in order to produce a time variant apparent light intensity. Additionally, the bit stream may be encoded using variable pulse width modulation (VPPM). The fluctuating light may be an LED light source. Moreover, a first data stream may be the bit stream, and a second data stream may be a low rate modulation envelope created on the pulses. The low rate modulation envelope may indicate that a second data stream may be transmitted from the light source. The light source may originate from intelligent billboards, signs, displays, or vehicles, or any combination thereof.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for light wave communications, comprising:
a light source;
a memory that is to store instructions and that is communicatively coupled to the light source; and
a processor communicatively coupled to the light source and the memory, wherein when the processor is to execute the instructions, the processor is to:
generate a first data stream using an apparent intensity of the light source; and
generate a second data stream using a pulse position of the light source.

2. The system of claim 1, wherein the light source is an LED light source.

3. The system of claim 1, wherein the processor is to periodically vary the first data stream in order to produce a time variant apparent light intensity.

4. The system of claim 1, wherein the processor is to periodically vary the first data stream by varying a width of light pulses from the light source.

5. The system of claim 1, wherein the processor is to periodically vary the first data stream and the variation is undetectable by humans.

6. The system of claim 1, wherein the processor is to periodically encode the second data stream using variable pulse width modulation (VPPM).

7. The system of claim 1, wherein the processor is to encode the second data stream using Manchester encoding.

8. The system of claim 1, wherein the system is a component of an automobile.

9. The system of claim 1, wherein the light source is a component of a billboard, sign, or any combination thereof.

10. An apparatus for light wave communications, comprising:
an image sensor, wherein the image sensor is to receive a first low frequency data stream generated using an apparent intensity of a light source; and
a region of interest (ROI) sub-sampler, wherein data from the ROI sub-sampler is used to configure the image sensor to receive a second data stream generated using a pulse position of the light source.

11. The apparatus of claim 10, wherein the second data stream is a stream of high rate pulses.

12. The apparatus of claim 10, wherein the second data stream is a stream of high rate pulses varied using variable pulse width modulation (VPPM).

13. The apparatus of claim 10, wherein the image sensor is configured to receive a second data stream by using the ROI sub-sampling to increase an effective frame rate of the image sensor.

14. The apparatus of claim 10, wherein the first low frequency data stream from a light source is periodically varied in order to produce a time variant apparent light intensity.

15. The apparatus of claim 10, wherein the region of interest sub-sampler is to determine a region of interest based on the first low frequency data stream.

16. A method of light wave communication, comprising:
creating a fluctuating light from a light source by pulsing the light source on and off;
creating a bit stream by positioning the pulses of light within a bit time period;
creating a low rate modulation envelope on the pulses by pulse width modulation; and
configuring a camera to detect two data streams from the fluctuating light and the bit stream.

17. The method of claim 16, wherein the image sensor camera is configured to detect the bit stream based on ROI sub-sampling.

18. The method of claim 16, comprising:
detecting the fluctuating light with the camera to determine a target for ROI sub-sampling; and
configuring the camera to detect a bit stream from the fluctuating light based on the target for ROI sub-sampling.

19. The method of claim 16, wherein the fluctuating light is periodically varied in order to produce a time variant apparent light intensity.

20. The method of claim 16, wherein the bit stream is encoded using variable pulse width modulation (VPPM).

21. The method of claim 16, wherein the fluctuating light is an LED light source.

22. The method of claim 16, wherein a first data stream is the bit stream and a second data stream is a low rate modulation envelope created on the pulses.

23. The method of claim 16, wherein the low rate modulation envelope is to indicate that a second data stream is transmitted from the light source.

24. The method of claim 16, wherein the light source is to originate from intelligent billboards, signs, displays, or vehicles, or any combination thereof.

* * * * *